Patented Jan. 22, 1952

2,583,136

UNITED STATES PATENT OFFICE 2,583,136

PROCESS OF REGENERATING AN AQUEOUS ALKALI METAL HYDROXIDE SOLUTION

Donald C. Bond, Northbrook, Ill., assignor to The Pure Oil Company, Chicago, Ill., a corporation of Ohio No Drawing. Application September 23, 1944, Serial No. 555,587

3 Claims. (Cl. 23—184)

This invention relates to removal of acidic sulfur compounds from hydrocarbons, and more particularly to the removal of mercaptans from hydrocarbon oil distillates such as gasoline. This application is a continuation, in part, of application Serial #537,969, filed May 29, 1944, and entitled "Removal of Acidic Sulfur Compounds from Hydrocarbons."

The extraction of acidic sulfur compounds such as mercaptans and thiophenols from hydrocarbon oils by means of washing with aqueous caustic alkali solutions, which may be fortified with solubility promoters such as alkali metal salts of isobutyric acid, metal naphthenates and alkali metal cresylates, is well known. In such processes the oil to be treated is contacted with approximately 5 to 20% by volume of the aqueous alkali solution in order to either remove the major portion of the mercaptans or to extract substantially all the mercaptans and leave the oil "doctor" sweet. This type of treatment, instead of converting the mercaptans to disulfides which remain in the gasoline, removes the mercaptans from the oil, thereby reducing the sulfur content thereof. Processes of this type which are now in commercial use are the "Solutizer" process and the "Mercapsol" process.

In both the "Solutizer" and the "Mercapsol" processes it has been common practice to regenerate the used alkali solution by steam stripping in order to hydrolyze the mercaptides in the solution to mercaptans which vaporize and can be separated from the solution. Although steam stripping is a highly satisfactory method of regeneration, it is fairly expensive because of the comparatively large amounts of steam which must be generated for the stripping operation. Another method of regenerating used alkali solutions containing mercaptides is to blow with air or other gas containing free oxygen. In such processes it has already been suggested to use a solid catalyst such as nickel sulfide to accelerate the regeneration of the solution.

This invention is directed to a process of extracting mercaptans and other acidic sulfur compounds from hydrocarbons by means of alkali solutions containing a small amount of a soluble monohydroxy phenolic compound or substance which does not deleteriously affect the extraction process, but which acts as a catalyst to accelerate the oxidation regeneration of the used alkali solution. The compounds or substances which are useful in accordance with the invention are those monohydroxy aromatic compounds in which the hydroxy group is attached to carbon in an aromatic nucleus or benzene ring and (1) which are soluble in the alkali solution in sufficient amount to accelerate the oxidation of mercaptides and preferably to approximately 1% by weight, or more; (2) are capable of oxidation to the quinone form by means of air in aqueous alkali solutions; (3) have critical oxidation potentials below the critical oxidation potential of the mercaptans contained in the oil, which are to be removed, and (4) contain no basic groups. An outstanding example of a compound which meets the requirement above set forth is 9-anthranol, otherwise known as 9-hydroxy anthracene.

In order to demonstrate the effectiveness of compounds within the scope of the invention as oxidation accelerators for the regeneration of alkali solutions containing mercaptides a standard aqueous alkali solution was prepared containing 10% by weight of sodium hydroxide and 1% by weight of sulfur in the form of normal butyl mercaptan. To a 50 cc. sample of this solution was added 1% by weight of the monohydroxy phenolic compound which was to be tested as an oxidation catalyst, and the sample placed in a 100 cc. graduated cylinder containing 75 cc. of No. 4 glass beads. A dip tube was placed in the cylinder so that the bottom thereof extended to the bottom of the cylinder and air was passed through the tube and bubbled through the solution for one hour at the rate of 0.03 cubic foot per hour at a temperature of 75° F. At the end of the blowing period the mixture was washed with VMP naphtha to remove the disulfides therefrom. The naphtha containing dissolved disulfides was treated with acidic silver nitrate to remove any unoxidized mercaptans and was then analyzed for disulfides.

The above described test was run on a sample of standard sodium hydroxide solution containing no oxidation catalyst, and on two other samples, one of which contained 1% of 9-anthranol, and the other of which contained 1% of p-hydroxy phenyl glycine. The results obtained in the test, as well as the solubility of the catalyst in the caustic soda solution, and the critical oxidation potentials of the oxidation catalysts and of typical mercaptans found in gasoline are set forth in the following table:

| Compound | Solubility in 10 Per Cent NaOH Solution | Per Cent by Weight Butyl Mercaptan Oxidized | Critical Oxidation Potential in MV |
|---|---|---|---|
| | Per Cent | | |
| None | | 0.9 | |
| P-Hydroxy Phenyl Glycine | >1 | 0.8 | 603 |
| 9-Anthranol | >1 | 8.1 | 693 |
| N-Butyl Mercaptan | | | >807 |
| N-Propyl Mercaptan | | | 812 |
| Iso-Propyl Mercaptan | | | 819 |

The critical oxidation potentials of various compounds and substances are determined in accordance with the method of Fieser, set forth in the Journal of the American Chemical Society No. 52, pages 5204 to 5241 for the year 1930. The procedure was as follows: A cell was made consisting of a hydrogen electrode and a bright platinum electrode dipping into a neutral alcoholic buffer solution, and connected by means of a bridge filled with the buffer solution. The buffer solution used to determine the critical oxidation potentials of the various substances hereinafter set forth was prepared by diluting to one liter with Formula 30 alcohol, 534 cc. of an aqueous solution containing .07 mole of potassium dihydrogen phosphate and .105 mole of disodium hydrogen phosphate per liter. An alcoholic solution of potassium ferro and ferri cyanides was added to the half-cell containing the platinum electrode. The ferro and ferri cyanide solutions were separately prepared by dissolving 0.03 mole of each salt in 200 cc. of water and diluting to 1 liter with the alcoholic buffer solution. After measuring the initial potential of the cell by means of a potentiometer the material to be tested was added to the half-cell containing the platinum electrode after it has been dissolved in 30 cc. of the alcoholic buffer solution. The potential of the cell was immediately measured and again measured after 1 minute and 5 minutes. If the potential is unchanged after 5 minutes the critical oxidation potential of the tested compound is greater than the potential of the cell. If the potential decreases in 5 minutes the critical oxidation potential of the tested compound is less than the initial potential of the cell. Measurements are made in millivolts.

It is apparent from the table that in the absence of any catalyst the percent of butyl mercaptan which was oxidized is 0.9%. In the presence of 1% of 9-anthranol, 8.1% of mercaptan was oxidized in the test, whereas use of p-hydroxy phenyl glycine resulted in oxidation of only 0.8% of the mercaptan. p-hydroxyl phenyl glycine meets every requirement of the class of oxidation catalysts coming within the scope of the invention, with the exception that it contains a basic group.

Tests similar to those just described were made on alkali solutions prepared by mixing together 10 parts by weight of sodium hydroxide, 10 parts by weight of commercial cresols and 80 parts by weight of water and adding to the solution 1% by weight of normal butyl mercaptan. In the solution containing no oxidation catalyst, oxidation of only 0.7% by weight of mercaptan took place. In the solution to which had been added 1% by weight of 9-anthranol oxidation of 9.9% of the mercaptan was obtained.

It is to be understood that the invention includes monohydroxy aromatic compounds which are not sufficiently soluble in ordinary aqueous alkali solutions but are rendered sufficiently soluble by the presence of substances such as cresols, which may or may not act as solubility promoters for mercaptans, but which have the effect of solubilizing the catalyst in the alkali solution. It is to be further understood that the invention contemplates the use of solubility promoters in the alkali solution and that in the claims appended hereto the term "aqueous alkali solution" refers to solutions which do not contain solubility promoters as well as solutions containing any of the known solubility promoters such as alkali metal napthenates, alkali metal cresolates and alkali metal isobutyrates.

In using the invention approximately .01 to 2% by weight of the monohydroxy aromatic compound is sufficient in the alkali solution to catalyze the oxidation regeneration thereof although larger quantities may be used. Generally speaking, 1% of the catalyst suffices. Gasoline, or other hydrocarbon fluid to be treated, is preferably contacted with the alkali solution containing the catalyst in a countercurrent operation in the presence of contacted surfaces at atmospheric temperature, and at either atmospheric or at subatmospheric pressure. From 5 to 20% by volume of the alkali solution based on the oil being treated is sufficient to extract the desired amount of mercaptans from the oil. The alkali solution should preferably contain at least 10% by weight of free alkali metal hydroxide, either sodium or potassium, or mixtures thereof, and may contain suitable solubility promoters for the mercaptans.

In the regeneration of the used alkali the used alkali is preferably countercurrently contacted with a stream of air in a tower filled with contacting surfaces such as Raschig rings. Regeneration proceeds satisfactorily at atmospheric temperature and pressure. Temperature of between 60 and 130° F. may be used, although lower or higher temperatures are not excluded. Lower temperatures require longer times for regeneration and higher temperatures, although they tend to shorten the regenerating period, may give rise to formation of undesirable oxidation products. Regeneration may be carried out at atmospheric pressure, subatmospheric pressure or superatmospheric pressure. In the regeneration care should be exercised not to reduce the mercaptide sulfur content of the solution undergoing regeneration below an amount in excess of the amount required to reduce any quinone present to the corresponding phenol form. If this precaution is not observed, a portion or all of the catalyst remains in the quinone form which, upon contact with oil containing mercaptans, oxidizes the mercaptans to disulfides in situ. Moreover the regenerated caustic solution should be permitted to stand sufficiently long before reuse to insure that all quinone is reduced to the corresponding phenol. This time may be different for each catalyst and may differ for different amounts of the same catalyst.

In general, the mercaptide sulfur content of the alkali solution undergoing regeneration should not be reduced below approximately .2% to .6% by weight.

It is important therefore that in regenerating alkali solutions with phenolic catalyst in accordance with my invention, that the quantity-time relationship of the particular catalyst be determined and that the mercaptide sulfur content of the used alkali solution be kept above the amount necessary to reduce the entire quinone content of the solution to phenols and that sufficient time be allowed for the reduction to take place before treating additional quantities of oil. Failure to observe these precautions not only causes oxidations of mercaptans in the oil to disulfides but also results in degradation of the catalyst to compounds which cannot be restored to the desired phenols, thereby necessitating further and frequent addition of catalyst to the treating solution.

It will be seen, therefore, that I have developed a process for extracting mercaptans from gasoline by means of aqueous alkali solutions containing small amounts of monohydroxy phenolic oxidation catalysts in solution in the treating solution. These phenolic compounds which accelerate air regeneration of the alkali do not cause oxidation of mercaptans in the oil undergoing treatment if the treatment is conducted in the absence of oxygen and other oxidizing agents. By controlling the regeneration of the alkali the catalyst remains substantially unchanged and can be re-used through a large number of regeneration recycles.

In commercial practice it may be desirable to blow the regenerated alkaline solution with steam, nitrogen or other inert gas to remove occluded oxygen prior to recontacting the regenerating solution with oil. As a further step to insure against the formation in or addition of disulfides to the gasoline the regenerated alkaline solution, after separation of disulfides formed by the oxidation, may be washed with naphtha or other water immiscible solvent for disulfides in order to remove any disulfides which remain suspended or occluded in the alkaline solution. It is to be understood, however, that the invention can be practiced without using either the step of inert gas blowing or naphtha washing.

The process can be carried out in a continuous manner by contacting the oil to be treated with the aqueous alkali solution in one step and by countercurrently contacting withdrawn alkaline solution with air in a second step followed by separation of the oily disulfide layer from the unregenerated alkaline solution and recycling of the alkaline solution to the oil treatment step. Various reagents may be added to the treating solution from time to time as required to make up for losses which occur in the various steps of the process.

It is claimed:

1. In the regeneration of aqueous alkali metal hydroxide solution, containing mercaptides, resulting from extraction of mercaptans from hydrocarbon fluid, by contacting said solution with gas containing free oxygen in the presence of a small amount of a phenolic oxidation promoter in order to oxidize the mercaptides to disulfides and in which regeneration is stopped short of complete oxidation of said mercaptides in order to leave a sufficient amount present in the alkali solution to insure that the promoter is reduced to a non-oxidizing state and not degraded to an inactive state, the improvement comprising using 9-anthranol as the oxidation promoter.

2. The regeneration in accordance with claim 1 in which the alkali metal hydroxide solution contains from 5 to 50% by weight of alkali metal hydroxide and from 0.1 to 2% by weight of 9-anthranol.

3. The regeneration in accordance with claim 2 in which the gas containing free oxygen is air and the regeneration is carried out at approximately atmospheric temperature.

DONALD C. BOND.

REFERENCES CITED

The following references are of record in the file of this patent:

UNITED STATES PATENTS

| Number | Name | Date |
|---|---|---|
| 1,855,353 | Jacobson | Apr. 26, 1932 |
| 1,943,744 | Rosenstein | Jan. 16, 1934 |
| 2,015,038 | Pevere | Sept. 17, 1935 |
| 2,315,530 | Loyd | Apr. 6, 1943 |

FOREIGN PATENTS

| Number | Country | Date |
|---|---|---|
| 126,544 | Hungary | Mar. 17, 1941 |

OTHER REFERENCES

Karrer: Organic Chemistry, 1946, 2nd ed., pages 420–422, 561. Elsevier Publishing Co., N. Y.